(12) United States Patent
Hong et al.

(10) Patent No.: US 8,467,327 B2
(45) Date of Patent: Jun. 18, 2013

(54) SENSOR NETWORK SYSTEM AND COMMUNICATION METHOD THEREOF

(75) Inventors: Seung Ki Hong, Daejeon (KR); Jong Arm Jun, Daejeon (KR); Cheol Sig Pyo, Daejeon (KR); Sang Hun Lee, Seoul (KR); Lynn Choi, Seoul (KR)

(73) Assignees: Electronics and Telecommunications Research Institute, Daejeon (KR); Korea University Research & Business Foundation, Seoul (KR)

( * ) Notice: Subject to any disclaimer, the term of this patent is extended or adjusted under 35 U.S.C. 154(b) by 289 days.

(21) Appl. No.: 12/874,856

(22) Filed: Sep. 2, 2010

(65) Prior Publication Data

US 2011/0051645 A1    Mar. 3, 2011

(30) Foreign Application Priority Data

Sep. 2, 2009   (KR) .................. 10-2009-0082617

(51) Int. Cl.
*G08C 17/00*   (2006.01)

(52) U.S. Cl.
USPC ........... 370/311; 370/356; 370/338; 370/327; 370/321; 370/326; 370/347

(58) Field of Classification Search
USPC ............... 370/356, 311, 338, 327, 321, 7.32, 370/326, 345, 347
See application file for complete search history.

(56) References Cited

U.S. PATENT DOCUMENTS

| | | | |
|---|---|---|---|
| 7,653,394 B2 * | 1/2010 | McMillin ...................... | 455/444 |
| 7,738,413 B2 * | 6/2010 | Varaiya et al. ................ | 370/321 |
| 8,089,909 B2 * | 1/2012 | Kim et al. ..................... | 370/311 |
| 8,169,942 B2 * | 5/2012 | Bahk et al. .................... | 370/311 |
| 2006/0245360 A1 * | 11/2006 | Ensor et al. .................... | 370/238 |
| 2009/0147760 A1 * | 6/2009 | Lee et al. ...................... | 370/338 |

(Continued)

OTHER PUBLICATIONS

Van Dam, Tijs et al., "An Adaptive Energy-Efficient MAC Protocol for Wireless Sensor Networks," SenSys '03 Proceedings of the 1st International Conference on Embedded Networked Sensor Systems, pp. 171-180 (2003).

(Continued)

*Primary Examiner* — Ian N Moore
*Assistant Examiner* — Phong La
(74) *Attorney, Agent, or Firm* — Nelson Mullins Riley & Scarborough LLP; EuiHoon Lee, Esq.

(57) ABSTRACT

Provided are a communication method and system for sensor network. In reporting event occurrence in a real-time sensor network application, a cycle time is divided into an event announcement period and a data transmission period to provide real-time transmission performance and energy efficiency. Each of the periods is again divided into the number of slots equal to the maximum depth of a network. Respective nodes sequentially operate according to their depths in a routing tree during the event announcement period to receive the signal transmitted from the lower node. To remove sleep delay, a slot next to the signal reception slot becomes a signal transmission slot. A node sensed an event transmits a signal informing event occurrence during its signal transmission slot, and this signal includes only the address of the transmission node. When a signal does not exist in the event announcement period, no traffic occurs in the data transmission period and the upper nodes maintain a sleep state. When a signal is transmitted during the event announcement period, nodes transmitting/receiving a corresponding signal operate during the data transmission period to transfer data packets.

17 Claims, 5 Drawing Sheets

U.S. PATENT DOCUMENTS

| | | | |
|---|---|---|---|
| 2009/0168678 A1* | 7/2009 | Han et al. | 370/311 |
| 2009/0213816 A1* | 8/2009 | Guo et al. | 370/336 |
| 2009/0296704 A1* | 12/2009 | Kim et al. | 370/389 |
| 2010/0142497 A1* | 6/2010 | Kim et al. | 370/337 |
| 2010/0290379 A1* | 11/2010 | Bahk et al. | 370/311 |
| 2010/0302933 A1* | 12/2010 | Sreenan et al. | 370/217 |
| 2010/0310258 A1* | 12/2010 | Wang et al. | 398/115 |
| 2011/0002251 A1* | 1/2011 | Shin et al. | 370/311 |
| 2011/0051645 A1* | 3/2011 | Hong et al. | 370/311 |

OTHER PUBLICATIONS

Ye, Wei et al., "An Energy-Efficient MAC Protocol for Wireless Sensor Networks," INFOCOM 2002, Proceedings of the Twenty-first Annual Joint Conference of the IEEE Computer and Communications Societies, vol. 3:1567-1576 (2002).

Aakaya, Kemal et al., "A survey on routing protocols for wireless sensor networks," Ad Hoc Networks, vol. 3:325-349 (2005).

* cited by examiner

SENSOR NETWORK SYSTEM AND COMMUNICATION METHOD THEREOF

CROSS-REFERENCE TO RELATED APPLICATIONS

This application claims priority under 35 U.S.C. §119 to Korean Patent Application No. 10-2009-0082617, filed on Sep. 2, 2009, in the Korean Intellectual Property Office, the disclosure of which is incorporated herein by reference in its entirety.

TECHNICAL FIELD

The following disclosure relates to a sensor network system and a communication method thereof, and in particular, to a sensor network system and a communication method thereof, which provide real-time transmission performance and improved energy efficiency.

BACKGROUND

A sensor network is being widely used in various real-time application fields, such as forest fire detection, intrusion detection, real-time target trace, emergency relief, and real-time traffic information collection systems. Real-time sensor network applications require the real-time operation on event occurrence, and thus real-time communication characteristic is required as well as low power characteristic which has been required by a related art sensor network application. However, most researches have been concentrated on low-power communication techniques for improving the energy efficiency of the sensor network.

One of the related art low-power communication techniques are using a method that repeats periodic wakeup and sleep, which minimizes undesired operations to decrease power consumption. Generally, energy consumed by communication modules is greater than that consumed through operations. In a sensor network, idle listening of radio frequency (RF) modules has been known to be the biggest energy waste factor. Thus, the energy consumption of a sensor network can be effectively reduced by maintaining a low duty cycle through periodic wakeup and sleep.

According to the periodic wakeup and sleep scheme, however, when a packet is transmitted, it has to wait until the reception node wakes up for each hop. It is called sleep delay, which delays packet transmission due to the sleep state of the reception node. Sleep delay is the main factor of the total transmission delay of packets.

To this end, it has been known that transmission performance is inversely proportional to the energy efficiency of the sensor network. In other words, if a duty cycle increases for enhancing transmission performance, the energy efficiency decreases due to the increased idle listening. If the duty cycle decreases for enhancing the energy efficiency, the transmission performance decreases due to the extended sleep delay.

In such an application as forest fire alarm in which the occurrence of an event should be reported as quickly as possible, transmission performance is a critical issue. The sensor nodes should also last for a long time for preventing the frequent replacement of sensor nodes. A related art sensor network Media Access Control (MAC) protocol cannot satisfy both transmission performance and the energy efficiency that are known to be mutually exclusive.

As another related art, a sequential wakeup approach has been proposed, in which each node sequentially wakes up according to its depth in a routing tree for providing real-time communication. The sequential wakeup approach prevents transmission delay due to sleep delay, thereby improving total transmission performance. The sequential wakeup approach removes channel acquisition contention between nodes having different depths, and thus allows channel contention in only a contention window, removing overhead for transmitting/receiving Request To Send/Clear To Send (RTS/CTS) packet. In this case, however, packet collision may not be avoided when there are multiple traffics. When a packet collision occurs, both transmission delay and energy consumption increase considerably.

SUMMARY

In one general aspect of the present invention, a method for transmitting and receiving event information in a sensor network including a plurality of sensor nodes includes: dividing a cycle time for event information transmission into a first period and a second period longer than the first period; transmitting or receiving a signal for informing occurrence of an event in the first period; and transmitting or receiving detailed event information in the second period, when the signal is transmitted or received in the first period.

The signal for informing event occurrence may be a short signal including an identifier of a node which transmits the signal.

The sensor network may include first and second nodes which transmit or receive event information. The first node may be a sink node, and the second node may be an arbitrary node among nodes deployed in a tree type from the first node.

The first period may include at least a first number of signal slots, the first number being equal to the maximum number of hops from the second node to the first node. The second node, nodes on a path from the second node to the first node and the first node may operate in the respective signal slots in order from the second node. The second period may include at least a second number of data slots, the second number being equal to the maximum number of hops from the second node to the first node. When the signal is transmitted or received in the first period, the second node, the nodes on the path from the second node to the first node and the first node may operate in the respective data slots in order from the second node to transmit or receive the detailed event information.

The second period may include at least a number of data slots equal to the multiplication of the maximum number of hops from the second node to the first node and the maximum number of data packets which are comprised in the detailed event information. When the signal is transmitted or received in the first period, the second node, the nodes on the path from the second node to the first node and the first node may repeat operating in the respective data slots in order from the second node by the number of data packets comprised in the detailed event information to transmit or receive the detailed event information.

The data packet included in the detailed event information may include a flag representing a presence of additional data.

When a signal received to the first node is a signal having certain strength and incapable of decoding, the transmitting or receiving of a signal may include: determining that collision occurs because signals informing event occurrence transmitted from the two or more of the second nodes and are simultaneously received on the first node; and transmitting, by the first node, a collision signal to an upper node of the first node.

The collision signal may have the same format as that of the signal informing event occurrence. The collision signal may include a collision bit. The two or more of the second nodes may determine occurrence of collision through signal overhearing, in the transmitting of a collision signal.

The two or more of the second nodes, the first node and the upper node of the first node may transmit or receive the detailed event information using Request To Send/Clear To Send (RTS/CTS) packet, after the transmitting of a collision signal.

The method may further include: establishing, by the sink node, a routing tree of the sensor network; collecting, by the sink node, depth information from the second node; and transmitting, by the sink node, the maximum value of the depth information to the second node.

In the transmitting of the maximum value, the sink node may transmit the maximum value and an initial start time corresponding to a start time of transmission or reception of a signal for informing event occurrence.

In another general aspect, a sensor network communication system divides a cycle time for event information transmission into a first period and a second period longer than the first period; transmits or receiving a signal for informing occurrence of an event in the first period; and transmits or receives detailed event information in the second period, when the signal is transmitted or received in the first period.

The sensor network communication system may include a first node which is a sink node, and second nodes deployed in a tree type from the first node. The first period may include at least a first number of signal slots, the first number being equal to the maximum number of hops from the second node to the first node. The second node, nodes on a path from the second node to the first node and the first node may operate in the respective signal slots in order from the second node. The second period may include at least a second number of data slots, the second number being equal to the maximum number of hops from the second node to the first node. When the signal is transmitted or received in the first period, the second node, the nodes on the path ranging from the second node to the first node and the first node may operate in the respective data slots in order from the second node to transmit or receive the detailed event information. When the signal is not transmitted or received in the first period, the second node, the nodes on the path ranging from the second node to the first node and the first node may maintain a sleep state.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Configuration of a Sensor Network

Figure 1:
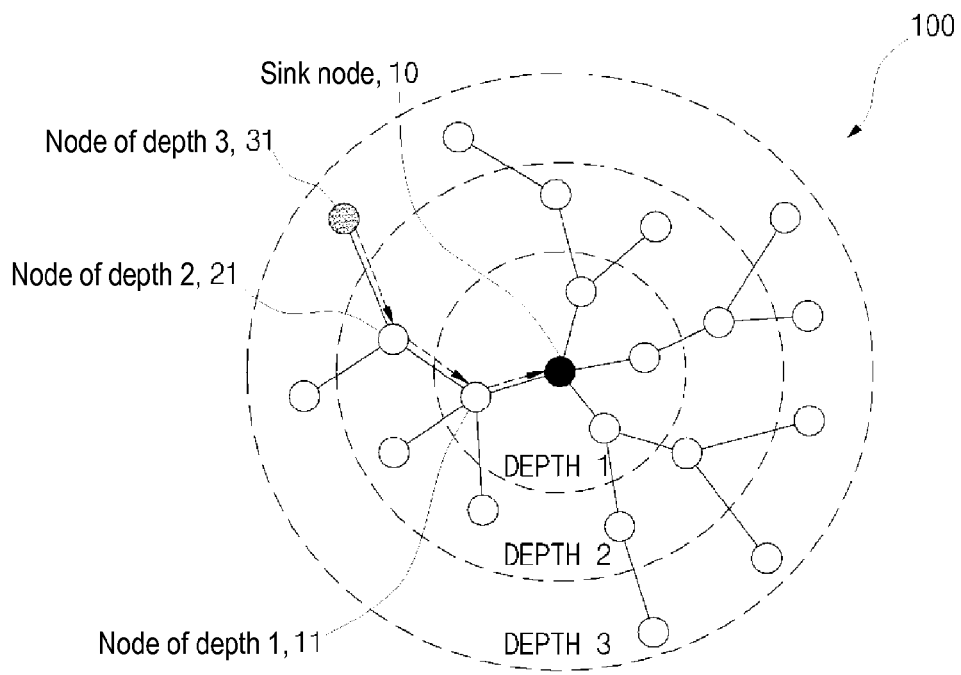
FIGS. 1 and 2 are block diagrams schematically illustrating a sensor network to which a communication method according to an exemplary embodiment is applied.
Figure 2:
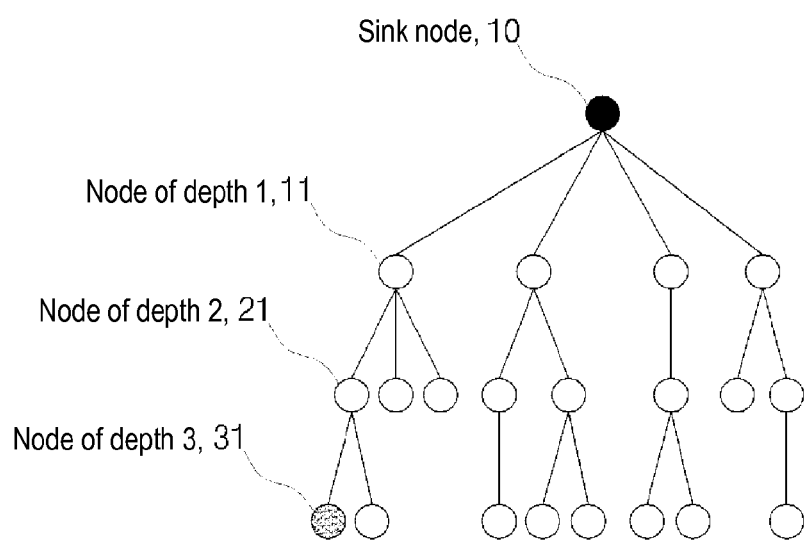

FIGS. 1 and 2 are diagrams schematically illustrating a sensor network to which a communication method according to an exemplary embodiment is applied. FIG. 1 illustrates the deployment of sensor nodes in the sensor network. FIG. 2 is a tree diagram to show each node by depth.

Referring to FIGS. 1 and 2, a sensor network 10 according to an exemplary embodiment includes a plurality of sensor nodes deployed in an area to which a corresponding application is applied, and the sensor nodes form a tree structure from a sink node 10. Herein, the sensor nodes may be fixed nodes or mobile nodes. In such a sensor network environment, it is assumed that most traffic is transmitted in a fixed direction and a tree type routing protocol is used. That is, a data packet dispatched by a sensor node which detected an event is sequentially transmitted from the node of a large depth to the node of a small depth. For example, when a node 31 disposed in depth 3 senses the occurrence of an event, data packet associated with the event is transmitted to the sink node 10 through the node 21 of depth 2 and the node 11 of depth 1.

At this point, when the transmission/reception time of each upper/lower node is preset in a routing tree and the upper node sets a reception period in accordance with the reception end time of the lower node, i.e., the transmittable time of the lower node, sleep delay due to the sleep state of a reception node may be removed. Such a scheme is called a sequential wakeup scheduling approach.

Basic Structure of Communication Method for Sensor Network

In an exemplary embodiment, the sequential wakeup scheduling approach is used, and a report of an event and an actual data transmission are performed separately. By dividing and processing the report of an event and the actual data transmission, the occurrence of the event can be first informed through a short signal within the shortest time right after the event is detected. Such a method is very useful in applications where quickest possible report of event occurrence is more important than specific data transmission for the event such as forest fire detection or intrusion detection.

For dividing the report of an event and data transmission, the communication method according to an exemplary embodiment divides the cycle time of each node into an event announcement period and a data transmission period.

Figure 3:
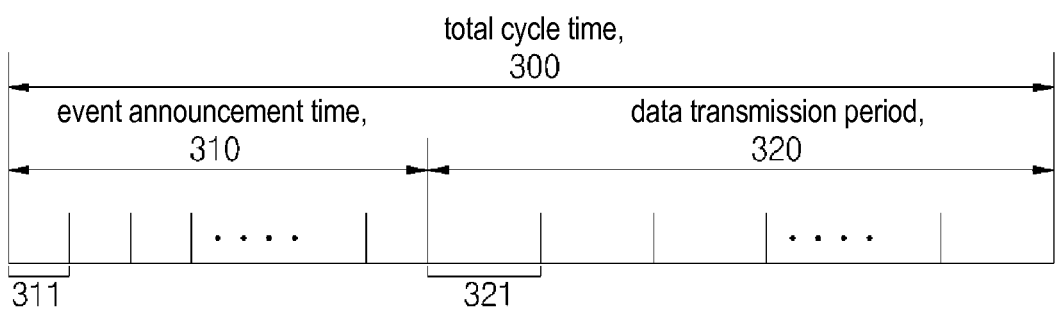
FIG. 3 is a diagram illustrating the configuration of a cycle time used in the communication method according to an exemplary embodiment.

FIG. 3 is a diagram illustrating the configuration of a cycle time used in the sensor network to which the communication method according to an exemplary embodiment is applied.

Referring to FIG. 3, a total cycle time 300 is divided into an event announcement period 310 and a data transmission period 320. The event announcement period 310 is divided into a plurality of signal slots 311, and the data transmission period 320 is divided into a plurality of data slots 321. Each node has a signal reception slot for signal reception and a signal transmission slot for signal transmission in the event announcement period and these two slots are disposed back to back. The position of the slots is determined according to the depth of each node in a routing tree.

The number of slots should be sufficient so that report and data for an occurring event may be transmitted from a node disposed at the end of the sensor network to the sink node. Accordingly, the number of signal slots is determined according to the number of hops from the sink node to a node farthest away from it among nodes in the entire network, and the number of data slots is set according to the maximum number of hops, the latency tolerance of the application, and the number of data packets necessary for the report of an individual event.

For example, in a sensor network shown in FIG. 1, the number of hops from the sink node to a node farthest away from it is 3, and thus the number of signal slots within the event announcement period becomes 3. If the number of data packets necessary for the report of an individual event is 2 and the latency tolerance of the application is 1, the number of data slots within the data transmission period becomes "(2+1)*3", which makes it 9.

The signal slot is a time period for transmitting a short signal to inform the occurrence of an event, and the length of the slot can vary according to the length of a signal. For minimizing idle listening by the signal slot and transmitting a signal within the shortest time, a contention window for carrier sensing is not included. Herein, since the contention window is not used, collision between a plurality of signal transmission nodes may occur. According to the communication method of an exemplary embodiment, possible collision of data packet is detected beforehand during the signal slot, which makes it possible to avoid the expected data packet collision. Detailed description of collision avoidance will be made below.

The data slot is a time period for each node to transmit detailed data based on the occurrence of an event. When a normal signal transmission has been performed during the event announcement period, data packets can be transmitted without collision between nodes during the data transmission period. Thus, the data slot does not need to have a separate contention window as the signal slot. The length of each slot varies varied according to the sizes of data and acknowledge (ACK) packets. For example, when the length of a packet to be transmitted is 80 bits in total and transmission speed in a wireless channel is 20 Kbps, it takes about 3.9 ms in signal transmission. Each slot has the inter-frame interval of a Short InterFrame Spacing (SIFS) length. The sum of the above two values becomes a length of a slot. As described above, the lengths of the signal slot and the data slot vary according to the length of a packet to be transmitted in the corresponding slot.

The length of a cycle time according to an exemplary embodiment is determined according to the maximum number of hops in a network, the maximum latency tolerance of the application, and the size of each packet. The maximum number of hops is determined according to a routing path that is generated after the deployment of sensor nodes.

For determining the cycle time, therefore, the number of hops to each node, i.e. depth information of each node should be collected after the deployment of sensor nodes, and the depth information should be informed to each node constituting the sensor network. This process is performed in the initialization operation of the network by three steps of routing tree establishment, depth information collection, and informing the maximum depth.

Figure 4:
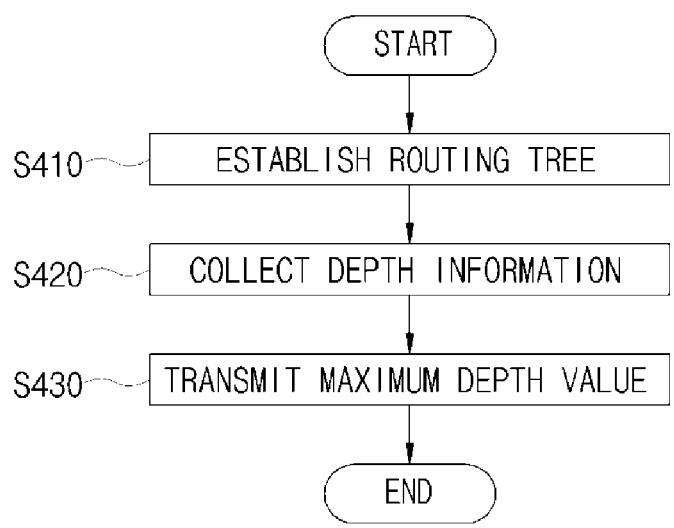
FIG. 4 is a flowchart illustrating an operation of determining the maximum depth in the sensor network to which the communication method according to an exemplary embodiment is applied.

FIG. 4 is a flowchart illustrating an operation of determining the maximum depth.

Referring to FIG. 4, a routing tree is established by the sink node in step S410. The established routing tree may be the one shown in FIG. 2.

In step S420 of collecting depth information, each leaf node in the routing tree reports its own depth to the sink node 10 (see FIG. 1). For example, in FIG. 1, the node 31 disposed in the depth 3 transmits its own depth 3 to the sink node 10. To guarantee that the sink node 10 has received information from all leaf nodes in a network as well as to decrease the number of depth information transmission, each node reports the largest depth information among those reported from all its lower nodes to its own upper node after all its lower nodes completed reporting. Accordingly, when the sink node 10 receives depth information from all its own lower nodes, the sink node knows that depth information collection is completed.

Finally, the sink node 10 transmits the largest depth value among the depth information received from the lower nodes to all the nodes in the network in operation S430.

In operation S430, by informing the initial start time of a sequential wakeup schedule along with the maximum depth value, the sink node 10 enables each node to start an operation based on a sequential schedule at the same time.

Report of Event Occurrence Using Event Announcement Period

The use of the event announcement period has its significance in dividing event occurrence fact and event occurrence information. As described above, in an application that should inform the occurrence of an event as soon as possible, such as fire occurrence or intrusion detection, data transmission may not be completed within a short time when there are substantial amount of data for an event occurrence. Accordingly, by dividing the event occurrence fact and detailed information of the event, the time required for informing the sink node of the occurrence of the event can get shorter.

In the event announcement period, a node sensing an event first informs other nodes on a transmission path of the event occurrence through a short signal, thereby allowing each node to control a wakeup schedule for succeeding data transmission.

Each node operates in an appropriate signal slot in accordance to its depth in a routing tree during the event announcement period for receiving a signal and thereby receives a signal transmitted from a lower node. At this point, since the report of event occurrence is made from a sensor node to the sink node, each node has a signal reception slot in order from the lower node to the upper node in the event announcement period.

A node sensing an event transmits a signal during its own signal transmission slot, and a slot succeeding a signal reception slot becomes a signal transmission slot for removing sleep delay. During this signal transmission slot, a node may transfer the signal received from its own lower node, or transmits a signal for an event that itself senses. Thus, each node operates in every signal reception slots of its own, and operates in the signal transmission slot only when it receives a signal or sensing an event. Because the signal is simply used as a means for first informing the occurrence of an event, it is composed of a short packet including the address of a node transmitting a signal only.

If the nodes transmitting signals confirm that their signals have been transmitted to upper nodes successfully, they can assure themselves that the upper nodes will operate properly for data reception during a data transmission period. For this purpose, each node allocates a signal overhearing slot after a signal transmission slot to check if the upper node transmits a signal. Since the upper node transmits a signal including its own address, a lower node checks the proper transmission of its own signal by checking the address of its upper node. For example, when an event occurs in the node 3 in FIG. 1, the node 3 transmits a signal including its own address to the node 2 (see FIG. 1) during its signal transmission period. Since the node 2 is in a signal reception period while the node 3 is being in the signal transmission period, it receives a signal from the node 3. Subsequently, the node 2 transmits a signal including its own address to the node 1 (see FIG. 1) in its signal transmission slot. At this point, by overhearing the signal including the address of the node 2, the node 3 checks that the transmission of its own signal is completed successfully.

Transmission of Detailed Data Through Selective Operation

A node operation in a data transmission period is determined according to whether a signal is received in the event announcement period. When a signal is not received in the event announcement period, corresponding upper nodes operate only in the event announcement period since traffic does not occur in the data transmission period. When signal transmission occurs in the event announcement period, nodes transmitting/receiving pertinent signals operate during in the data transmission period to transfer data packets.

In the meantime, when multiple events occur at the same time, reports of the respective events are sequentially transmitted depthwise, causing collision. When collision is sensed in the event announcement period, a technique for avoiding the collision should be used in the data transmission period. Such a scheme is called a selective wakeup technique. Through the selective wakeup technique, energy consumption by idle listening and collision can be reduced as well as transmission delay by the collision.

Specific Example of Communication Method for Sensor Network

Various examples of a communication method for sensor network according to an exemplary embodiment will be described below. Examples include a case with no event, a case with a single event, and a case with multiple events.

Case Having No Event

Figure 5:
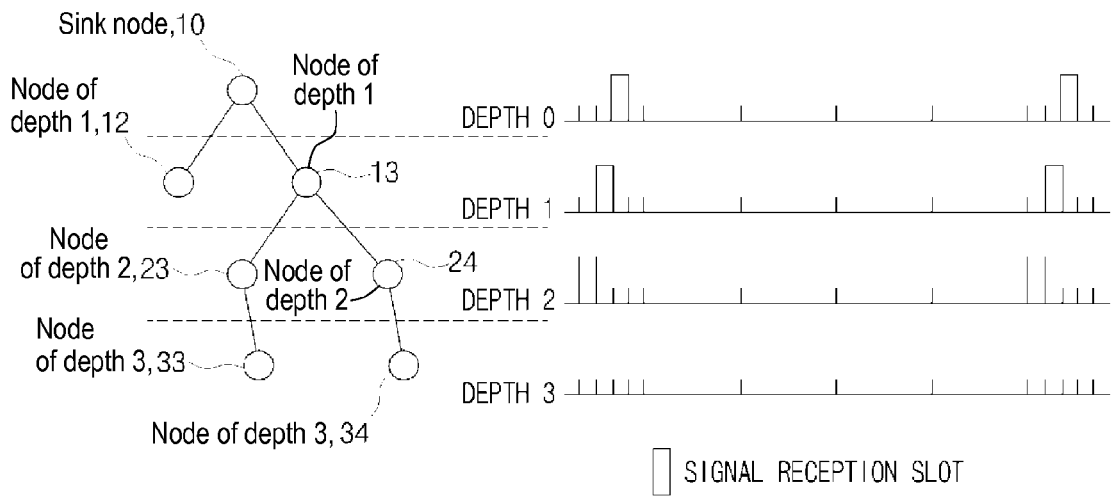
FIG. 5 is a diagram illustrating the active period of each node when no events occur.

FIG. 5 is a diagram illustrating the active period of each node when no events occur.

As shown in FIG. 5, in a case having no traffic, each node operates only in a receiving slot during an event announcement period and maintains a sleep state in other time. That is, leaf nodes 33 and 34 maintain sleep states, the upper nodes 23 and 24 (which are disposed in a depth 2) of the leaf nodes 33 and 34 operate in the first signal slot being its signal reception slot of the event announcement period, and nodes 12 and 13 (which are disposed in a depth 1) and a sink node 10 sequentially operate in the second and third signal slots of the event announcement period, respectively.

In the data transmission period, all nodes maintain sleep states because no events occur.

Single Event Occur-Single Data Packet Transmission

Figure 6:
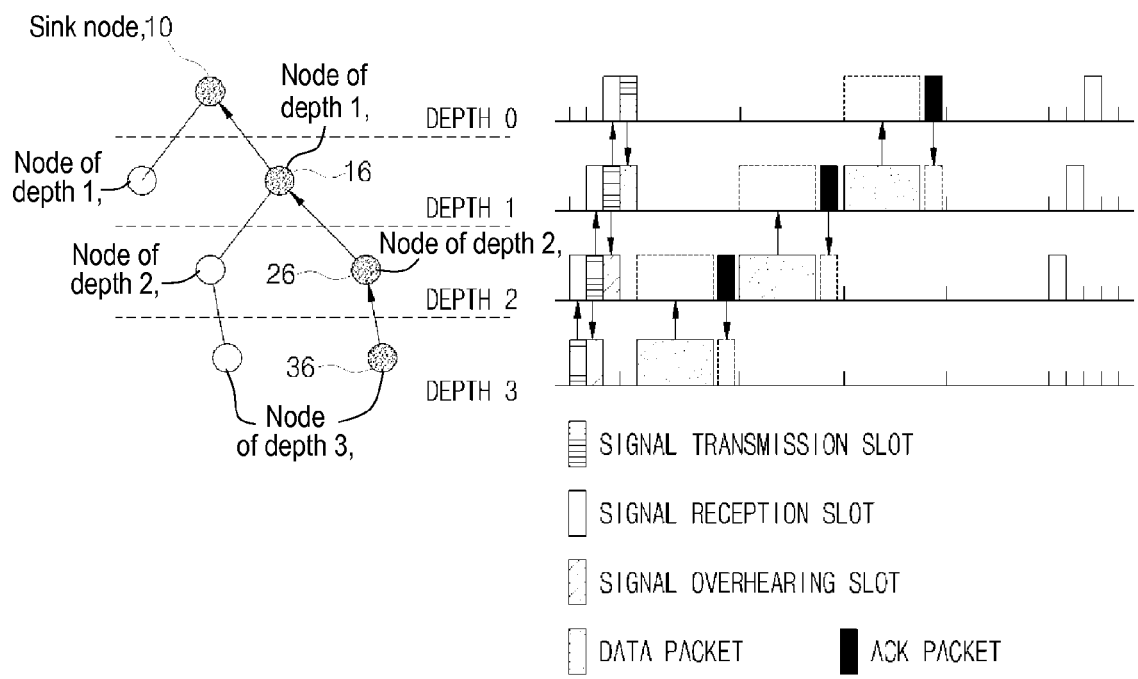
FIG. 6 shows signal transmission in an event announcement period and data transmission in a data transmission period, in a case where a single event occurs and the report of the event is made through a single packet.

FIG. 6 shows signal transmission in an event announcement period and data transmission in a data transmission period, in a case where a single event occurs and the report of the event is made through a single packet.

In an event announcement period, when a node 36 (sensing an event) disposed in a depth 3 transmits a signal in the first signal slot of the event announcement period, which is the signal transmission slot of its own, nodes 26 and 16 on a path sequentially receive signals in their signal reception slots and transmit signals in their transmission slots to report the occurrence of the event to the upper nodes. A node transmitted a signal checks if the signal is transmitted successfully by using a signal overhearing slot right next to its signal transmission slot.

When the event announcement period is terminated, the transmission of the event occurrence signal to the sink node 10 is completed and data transmission is started from the node 36 where the event occurred. In a data transmission period, each node has a data reception slot and a data transmission slot in the same scheme as that of an event announcement period. In a data reception slot and a data transmission slot, a data packet and an ACK packet for checking the reception of the data packet are transmitted/received, respectively.

The node 36 sensed an event transmits a data packet for the event to the upper node 26 disposed in a depth 2 using the first data slot of the data transmission period, and the data packet is transferred to the sink node 10 through each node on the path. When transmission in the data transmission period is terminated, the nodes on the path enter into sleep states until the next event announcement period.

Single Event Occurs-Multiple Data Packet Transmission

Figure 7:
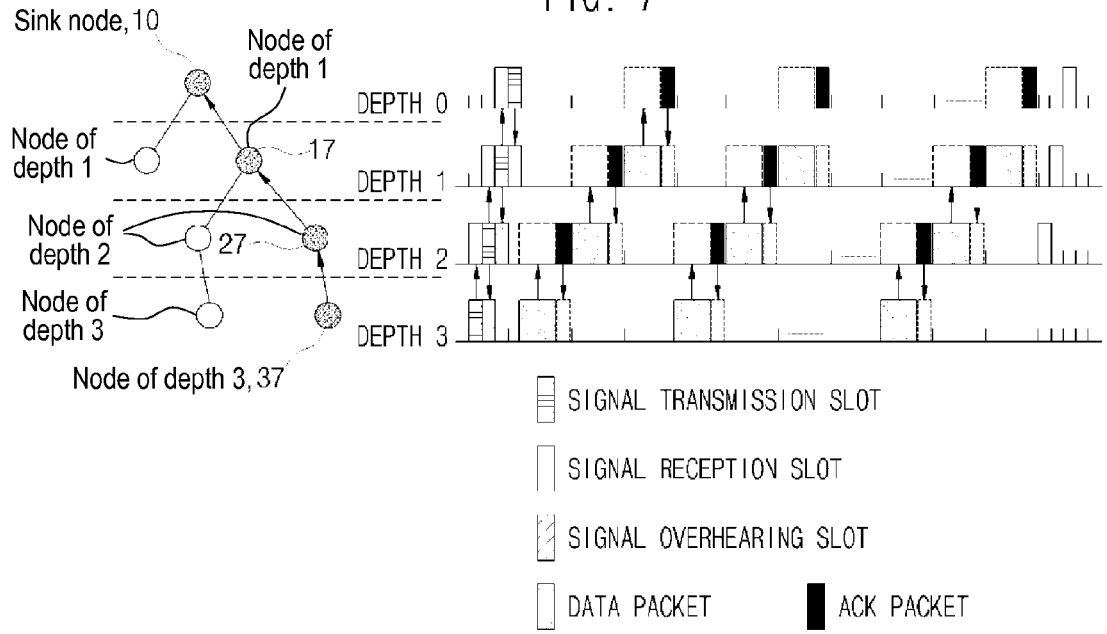
FIG. 7 is a diagram illustrating the operation of each node in a case that a single event occurs and the report of an event is made through a plurality of data packets.

FIG. 7 is a diagram illustrating the operation of each node in a case that a single event occurs and the report of an event is made through a plurality of data packets.

The operation in the event announcement period is the same as that of the single event-single packet case (described above with reference to FIG. 6). The transmission scheme of a data packet is also the same as that of the above-described case basically, but there is a difference in that such transmission is sequentially performed for several times.

A node 37 sensed an event transmits a data packet for the event to an upper node 27 disposed in depth 2 through the first data slot of a data transmission period. In this way, the data packet is transferred to the sink node 10 through nodes 37, 27 and 17 on a path. Herein, the transmission of the data packet is repetitively performed until all of the event information packets are transmitted. When transmission in the data transmission period is terminated by transferring all data packets, nodes on a transmission path enter into sleep states until next event announcement period.

For preventing a hidden terminal problem between successive packets, it is preferable that each node has the next data transmission slot after at least two slots after a data packet transmission. This is for avoiding collision between the successive packets when multiple packets are continuously transmitted. When transmission in the data transmission period is terminated, the nodes on the transmission path enter into sleep states until the next event announcement period. In this case, it is required to let each node on the path know which the last packet is and when the time to enter into the sleep states is. To this end, an end flag is included in a data packet header of the final packet to inform the nodes on the path of the final data packet by the node sensed the event.

Multiple Events Occur

When multiple events occur, report and data packets for the events collide in the middle of transmission to the sink node due to the characteristic that each node operates according to its depth. For preventing transmission delay and the increase of energy consumption due to on transmission failure caused by the collision, accordingly, a method is required that senses and avoids collision.

A conventional collision sensing method is to check the length of a received signal. That is, if a longer signal than the length of data represented in a packet header or a predetermined length is received, it is considered a collision between two signals happened. Such a method, however, is effective in a method that each node starts to transmit a packet at an arbitrary time, such as Carrier Sense Multiple Access (CSMA).

In a sensor network system according to an exemplary embodiment, however, a signal is transmitted at the same time with the start of a transmission slot since a contention window is not used. Thus, the signal received on the reception node is not longer by more than 1 byte in length than a predetermined length even when two or more packets from different nodes are transmitted and collided. Therefore, it is regarded as packet loss due to collision when the signal received to the reception node is one having certain strength and incapable of decoding.

The signal incapable of decoding may occur by a packet error due to noise, however, noise does not have a certain size and has rapidly changing characteristic unlike a packet signal. Thus, by continuously measuring the Received Signal Strength Indication (RSSI) of a received signal, a packet error by noise and a packet error by collision may be discriminated.

When collision occurs, all signal packets transmitted from the lower nodes are lost. Since it is impossible to check which node intends to receive and transmit a signal, signal transmission for event occurrence report may be stopped. To prevent signal transmission from stopping, nodes sensing collision transmit collision signals. The collision signal is the same signal as the short signal used in event report and includes the address of the node sensed collision and a collision bit for informing collision.

The node sensed collision and the nodes transmitted signals to the node sensed collision transmit data packets using a Carrier Sense Multiple Access with Collision Avoidance (CSMA/CA) technique, which uses RTS/CTS for avoiding collision. Therefore, the nodes transmitted the signals check if the signals they transmitted collide in the upper node through a signal overhearing period. When a collision signal is detected, the nodes perform a channel allocation operation using the RTS/CTS packet in the data transmission period.

Figure 8:
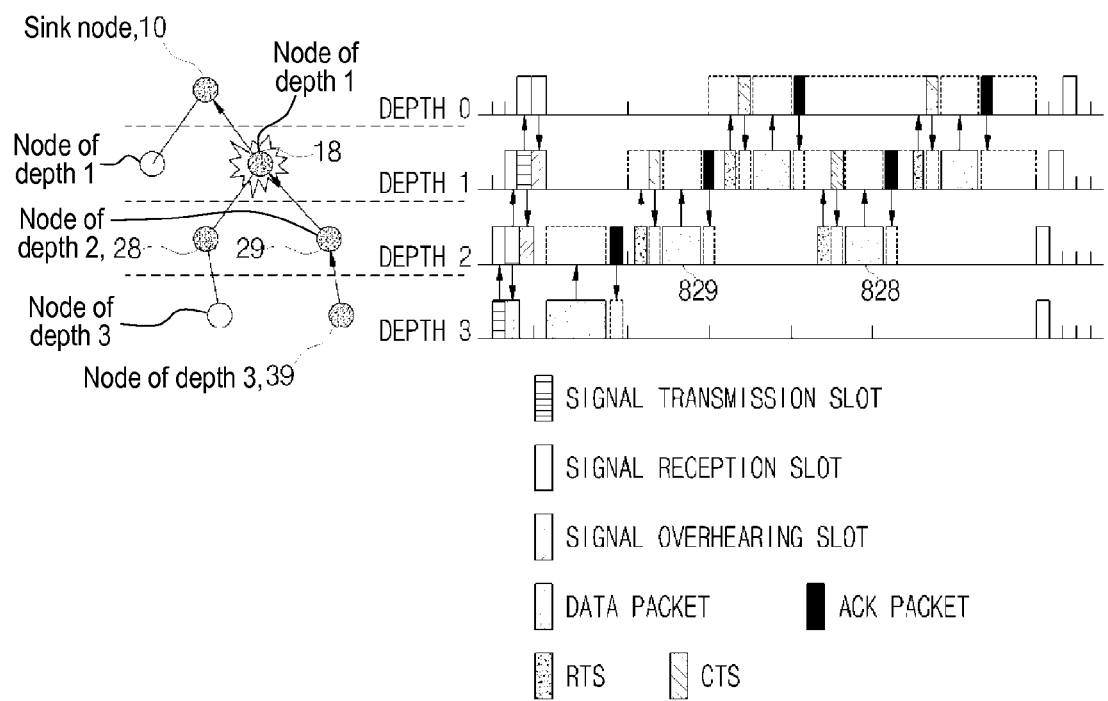
FIG. 8 is a diagram illustrating the operation of each node when a collision occurs due to the multiple event report.

FIG. 8 is a diagram illustrating the operation of each node when a collision occurs due to the multiple event report.

When events are sensed in the node 39 of depth 3 and the node 28 of depth 2, the reports of the two events collide in the node 18 of depth 1 in which two transmission paths meet. Then, the node 18 of depth 1, which sensed collision, transmits a collision signal to the sink node 10. That is, collision can be detected in the signal reception slot of the node 18 of depth 1 in the event announcement period, and two nodes 28 and 29, which transmitted the collided signals, may check the collision through signal overhearing in signal slots next to their signal transmission slots.

In this case, as illustrated in FIG. 8, the node 18 sensed collision and all nodes confirmed signal collision, the sink node 10 and the two nodes 28 and 29, transmit data packets using CSMA/CA technique. On the other hand, data transmission from another node 39 of depth 3, which sensed another event occurrence, to the upper node 29 is performed in the same way as the above-described case with no collision.

However, when a data packet is transmitted using CSMA/CA technique, a portion of a data slot should be allocated for RTS/CTS packet, and thus data transmission may not be completed in a single data slot. This is because the length of a data slot is determined according to the length of a data packet. That is, as advancing to upper nodes, data reception may not be started in accordance with a dedicated wakeup schedule and a data reception slot may be ended. Accordingly, nodes, which participate in data transmission using CSMA/CA technique, operate until a transmission operation is ended without changing states into operation and sleep states in accordance with data slots.

Because a node sensing collision may not know how many signals collide with only the strength of RSSI, it is impossible to know how many messages are transmitted in a data transmission period. Although the termination of one-time message transmission is confirmed by an end flag, another message may be transmitted. Thus, nodes on a transmission path are not aware of the time to change into sleep state. However, maintaining an idle state continuously to the next event announcement period while a message to transmit does no longer exists causes undesired energy consumption. The sensor network system according to an exemplary embodiment changes the state of a node into a sleep state by using a timer for reducing the undesired energy consumption.

Figure 9:
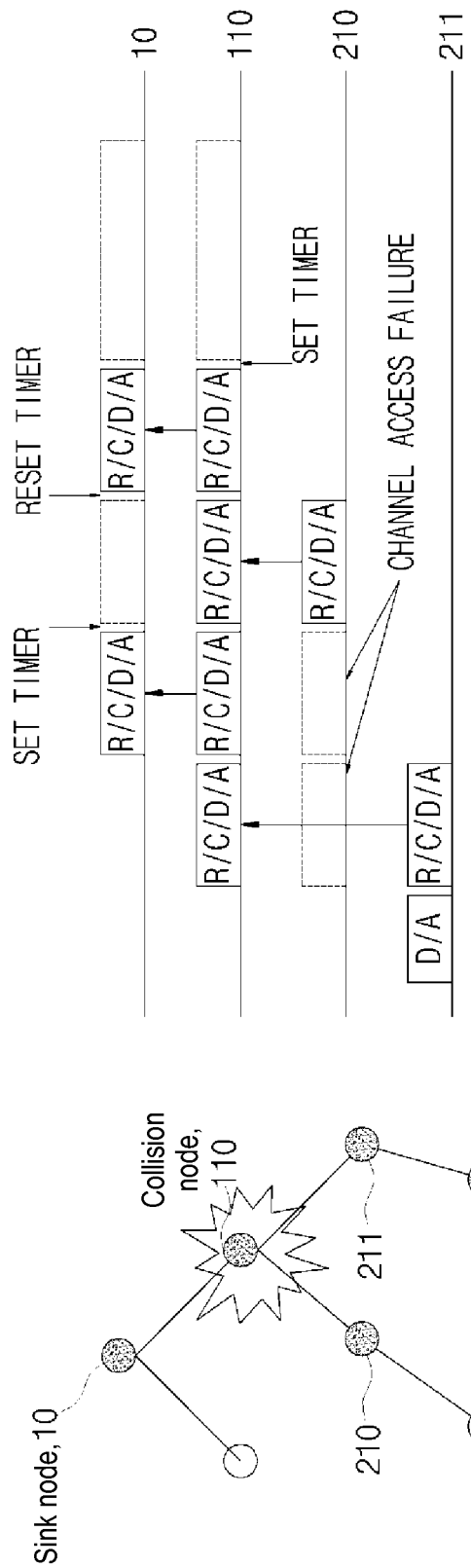
FIG. 9 is a diagram illustrating a method which controls the operation of a node with a timer when collision occurs during the event report operation for multiple events.

FIG. 9 is a diagram illustrating a method which controls the operation of a node with a timer when collision occurs during the event report operation for multiple events.

As illustrated in FIG. 9, the nodes reporting multiple events are a node 110 sensing collision and its upper nodes (for example, the sink node 10 in the case of FIG. 9). The nodes 110 and 10 continuously checks if there is additional data transmission until a preset timer is ended. When a new data packet is received, the nodes 110 and 10 update the timer to check again if there is additional data. When additional data is not transmitted for a preset time, the corresponding node is changed into sleep state.

Although the present invention has been described above on the basis of preferable embodiments, the communication method and system according to exemplary embodiments are not limited to the above-described embodiments. For example, the communication method according to exemplary embodiments is more effective in an application such as forest fire detection or intrusion detection, but it is not limited only to those applications. The sensor network applied to the communication method according to exemplary embodiments is not limited only to a tree type of network, either.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for transmitting and receiving event information between a first node and a second node in a sensor network including a plurality of sensor nodes, the method comprising:
   dividing a cycle time for event information transmission into a first period and a second period longer than the first period;
   transmitting or receiving a signal for informing occurrence of an event in the first period; and transmitting or receiving detailed event information in the second period, when the signal is transmitted or received in the first period, wherein:
the first node is a sink node, and the second node is an arbitrary node among nodes deployed in a tree type from the first node,
the first period comprises at least a first number of signal slots, the first number being equal to a maximum number of hops from the second node to the first node,
the second node, nodes on a path from the second node to the first node and the first node operate in the respective signal slots in order from the second node,
the second period comprises at least a second number of data slots, the second number being equal to a multiplication of the maximum number of hops from the second node to the first node and a maximum number of data packets which are comprised in the detailed event information, and
when the signal is transmitted or received in the first period, the second node, the nodes on the path ranging from the second node to the first node, and the first node repeat operating in the respective data slots in order from the second node by the number of data packets comprised in the detailed event information to transmit or receive the detailed event information.

2. The method of claim 1, wherein the signal for informing event occurrence comprises an identifier of a node which transmits the signal.

3. The method of claim 1, wherein:
the second period comprises at least a second number of data slots, the second number being equal to the maximum number of hops from the second node to the first node, and
when the signal is transmitted or received in the first period, the second node, nodes on the path ranging from the second node to the first node, and the first node operate in the respective data slots in order from the second node to transmit or receive the detailed event information.

4. The method of claim 1, wherein at least one of the data packets comprised in the detailed event information comprises a flag representing a presence of additional data.

5. The method of claim 1, wherein:
when a signal received on the first node is a signal having certain strength and incapable of decoding, in the step of transmitting or receiving a signal for informing event occurrence in the first period, the step of transmitting or receiving comprising:
determining that a collision occurs because signals informing event occurrence transmitted from two or more of the second nodes and are simultaneously received on the first node; and
transmitting, by the first node, a collision signal to an upper node of the first node.

6. The method of claim 5, wherein the collision signal has a same format as that of the signal informing event occurrence.

7. The method of claim 6, wherein the collision signal comprises a collision bit.

8. The method of claim 5, wherein the two or more of the second nodes determine occurrence of collision through signal overhearing, in the transmitting of a collision signal.

9. The method of claim 5, further comprising transmitting or receiving the detailed event information using Request To Send/Clear To Send (RTS/CTS) packet in the two or more of the second nodes, the first node and the upper node of the first node, after the transmitting of a collision signal.

10. The method of claim 1, further comprising:
establishing, by the sink node, a routing tree of the sensor network;
collecting, by the sink node, depth information from the second node; and
transmitting, by the sink node, a maximum value of the depth information to the second node.

11. The method of claim 10, wherein the sink node transmits the maximum value of the depth information and an initial start time corresponding to a start time of transmission or reception of a signal for informing event occurrence, in the step of transmitting the maximum value of the depth information.

12. A sensor network communication system including a plurality of sensor nodes which transmit or receive event information wherein: the sensor network communication system
divides a cycle time for event information transmission into a first period and a second period longer than the first period,
transmits or receives a signal for informing occurrence of an event in the first period, and
transmits or receives detailed event information in the second period, when the signal is transmitted or received in the first period, wherein:
the sensor nodes comprise a first node which is a sink node, and a second node that is an arbitrary node among nodes deployed in a tree type from the first node,
the first period comprises at least a first number of signal slots, the first number being equal to a maximum number of hops from the second node to the first node,
the second node, nodes on a path from the second node to the first node and the first node operate in the respective signal slots in order from the second node,
the second period comprises at least a second number of data slots, the second number being equal to a multiplication of the maximum number of hops from the second node to the first node and a maximum number of data packets which are comprised in the detailed event information, and
when the signal is transmitted or received in the first period, the second node, the nodes on the path ranging from the second node to the first node, and the first node repeat operating in the respective data slots in order from the second node by the number of data packets comprised in the detailed event information to transmit or receive the detailed event information.

13. The sensor network communication system of claim 12, wherein
when the signal is not transmitted or received in the first period, the second node, the nodes on the path ranging from the second node to the first node and the first node maintain a sleep state.

14. The sensor network communication system of claim 12, wherein the signal for informing event occurrence comprises an identifier of a node which transmits the signal.

15. The sensor network communication system of claim 12, wherein:
when a signal received on the first node is a signal having certain strength and incapable of decoding, in the transmitting or receiving a signal for informing event occurrence in the first period, the first node determines that a collision occurs because signals informing event occurrence transmitted from two or more other nodes and are simultaneously received on the first node.

16. The sensor network communication system of claim 12, wherein:

when a signal received on the first node is a signal having certain strength and incapable of decoding, in the transmitting or receiving a signal for informing event occurrence in the first period, the first node transmits a collision signal to an upper node of the first node.

17. The sensor network communication system of claim 12, wherein:

when a signal received on the first node is a signal having certain strength and incapable of decoding, in the transmitting or receiving a signal for informing event occurrence in the first period, the first node determines that a collision occurs because signals informing event occurrence transmitted from two or more other nodes and are simultaneously received on the first node, and the two or more other nodes, the first node and an upper node of the first node transmit or receive the detailed event information using Request To Send/Clear To Send (RTS/CTS) packet.

\* \* \* \* \*